(12) United States Patent
Engle et al.

(10) Patent No.: US 6,974,609 B2
(45) Date of Patent: Dec. 13, 2005

(54) MEDIA FOR COLD IMAGE TRANSFER

(76) Inventors: Lori P. Engle, P.O. Box 33427, St. Paul, MN (US) 55133-3427; Omar Farooq, P.O. Box 33427, St. Paul, MN (US) 55133-3427; Paul D. Graham, P.O. Box 33427, St. Paul, MN (US) 55133-3427; Jonathan P. Kitchin, P.O. Box 33427, St. Paul, MN (US) 55133-3427; Lisa M. Miller, P.O.Box 33427, St. Paul, MN (US) 55133-3427; David W. Tweeten, P.O. Box 33427, St. Paul, MN (US) 55133-3427

( * ) Notice: Subject to any disclaimer, the term of this patent is extended or adjusted under 35 U.S.C. 154(b) by 26 days.

(21) Appl. No.: 10/368,824

(22) Filed: Feb. 19, 2003

(65) Prior Publication Data
US 2003/0170429 A1 Sep. 11, 2003

Related U.S. Application Data

(60) Division of application No. 09/778,473, filed on Feb. 7, 2001, now abandoned, which is a continuation-in-part of application No. 09/500,150, filed on Feb. 8, 2000, now abandoned.

(51) Int. Cl.[7] .............................................. B41M 5/00
(52) U.S. Cl. ................ 428/32.2; 428/32.18; 428/195.1; 428/304.4
(58) Field of Search ........................... 428/32.12, 32.18, 428/195.1, 32.17, 32.6–32.87, 304.4, 195; 347/105

(56) References Cited

U.S. PATENT DOCUMENTS

| | | |
|---|---|---|
| 3,957,724 A | 5/1976 | Schurb et al. |
| 3,997,702 A | 12/1976 | Schurb et al. |

(Continued)

FOREIGN PATENT DOCUMENTS

| | | |
|---|---|---|
| EP | 0 461 796 A1 | 12/1991 |
| EP | 0 570 515 B1 | 11/1993 |
| EP | 0 832 756 A2 | 4/1998 |
| WO | WO 95/06564 | 3/1995 |
| WO | WO 96/26074 | 8/1996 |
| WO | WO 96/26840 | 9/1996 |
| WO | WO 97/07991 | 3/1997 |
| WO | WO 97/18950 | 5/1997 |
| WO | WO 97/33752 | 9/1997 |
| WO | WO 97/33758 | 9/1997 |
| WO | WO 98/29516 | 7/1998 |

(Continued)

OTHER PUBLICATIONS

W.A. Zisman described in "Relation of Equilibrium Contact Angle to Liquid and Solid Constitution", *ACS Advances in Chemistry Series #43*, American Chemical Society, 1961, pp. 1–51.
U.S. Appl. No. 09/324,092 (54908USA6A.002).
U.S. Appl. No. 09/448,626 (55091USA8A.002).
U.S. Appl. No. 09/500,153 (55188USA3A.002).

*Primary Examiner*—Rena Dye
*Assistant Examiner*—Tamra L. Dicus

(57) ABSTRACT

Image transfer media and methods of transferring images are provided. The image transfer media comprise a sheet having a nonporous micro-embossed surface topography comprising cavities on one major surface of the sheet and an ink release coating on the embossed surface, wherein said major surface has a surface energy of about 43 dyne/centimeter or less. A method of transferring an image to a substrate comprises the steps of (a) printing a selected image onto an imaging surface of an image transfer medium of the invention; (b) contacting the imaged micro-embossed surface with the substrate using pressure; and (c) removing the micro-embossed surface of the image transfer medium from the substrate.

22 Claims, 9 Drawing Sheets

U.S. PATENT DOCUMENTS

| | | |
|---|---|---|
| 4,313,988 A | 2/1982 | Koshar et al. |
| 4,567,073 A | 1/1986 | Larson et al. |
| 4,595,931 A | 6/1986 | Toganoh et al. |
| 4,605,592 A | 8/1986 | Paquette et al. |
| 4,614,667 A | 9/1986 | Larson et al. |
| 4,775,594 A | 10/1988 | Desjarlais |
| 4,904,519 A | 2/1990 | Newman |
| 4,935,307 A | 6/1990 | Iqbal et al. |
| 4,956,230 A | 9/1990 | Edwards et al. |
| 4,957,943 A | 9/1990 | McAllister et al. |
| 5,045,386 A | 9/1991 | Stan et al. |
| 5,126,195 A | 6/1992 | Light |
| 5,130,342 A | 7/1992 | McAllister et al. |
| 5,134,198 A | 7/1992 | Stofko, Jr. et al. |
| 5,141,790 A | 8/1992 | Calhoun et al. |
| 5,175,030 A * | 12/1992 | Lu et al. .......... 428/30 |
| 5,183,597 A * | 2/1993 | Lu .............. 264/1.38 |
| 5,192,617 A | 3/1993 | Stofko, Jr. et al. |
| 5,198,306 A | 3/1993 | Kruse |
| 5,202,190 A | 4/1993 | Kantner et al. |
| 5,208,092 A | 5/1993 | Iqbal |
| 5,219,928 A | 6/1993 | Stofko, Jr. et al. |
| 5,229,207 A | 7/1993 | Paquette et al. |
| 5,241,006 A | 8/1993 | Iqbal et al. |
| 5,290,615 A | 3/1994 | Tushaus et al. |
| 5,302,436 A | 4/1994 | Miller |
| 5,310,591 A | 5/1994 | Dodge et al. |
| 5,310,595 A | 5/1994 | Ali et al. |
| 5,326,619 A * | 7/1994 | Dower et al. .......... 428/32.8 |
| 5,342,688 A | 8/1994 | Kitchin et al. |
| 5,344,681 A | 9/1994 | Calhoun et al. |
| 5,352,736 A | 10/1994 | Stofko, Jr. et al. |
| 5,354,813 A | 10/1994 | Farooq et al. |
| 5,376,727 A | 12/1994 | Iqbal et al. |
| 5,389,723 A | 2/1995 | Iqbal et al. |
| 5,403,955 A | 4/1995 | Farooq |
| 5,445,866 A | 8/1995 | Martinson et al. |
| 5,449,540 A * | 9/1995 | Calhoun et al. .......... 428/42.1 |
| 5,464,900 A | 11/1995 | Stofko, Jr. et al. |
| 5,472,789 A | 12/1995 | Iqbal et al. |
| 5,518,809 A | 5/1996 | Henry et al. |
| 5,565,518 A | 10/1996 | Stofko, Jr. et al. |
| 5,567,507 A | 10/1996 | Paff et al. |
| 5,589,269 A | 12/1996 | Ali et al. |
| 5,658,802 A | 8/1997 | Hayes et al. |
| 5,667,674 A | 9/1997 | Hanggi et al. |
| 5,686,602 A | 11/1997 | Farooq et al. |
| 5,688,603 A | 11/1997 | Iqbal et al. |
| 5,707,722 A | 1/1998 | Iqbal et al. |
| 5,712,027 A | 1/1998 | Ali et al. |
| 5,721,086 A | 2/1998 | Emslander et al. |
| 5,747,148 A | 5/1998 | Warner et al. |
| 5,756,183 A * | 5/1998 | Kutsch et al. .......... 428/156 |
| 5,760,126 A | 6/1998 | Engle et al. |
| 5,766,398 A * | 6/1998 | Cahill et al. .......... 156/240 |
| 5,795,425 A | 8/1998 | Brault et al. |
| 5,837,375 A | 11/1998 | Brault et al. |
| 5,874,143 A * | 2/1999 | Peloquin et al. .......... 428/40.1 |
| 5,876,595 A | 3/1999 | Hanggi et al. |
| 5,932,355 A | 8/1999 | Iqbal et al. |
| 5,965,243 A | 10/1999 | Butler et al. |
| 5,968,652 A | 10/1999 | Hanggi et al. |
| 5,969,069 A | 10/1999 | Su et al. |
| 5,989,685 A | 11/1999 | Hockaday |
| 6,001,482 A * | 12/1999 | Anderson et al. .......... 428/32.24 |
| 6,080,261 A | 6/2000 | Popat et al. |
| 6,124,417 A | 9/2000 | Su |
| 6,165,593 A | 12/2000 | Brault et al. |
| 6,197,397 B1 * | 3/2001 | Sher et al. .......... 428/42.3 |
| 6,352,768 B1 * | 3/2002 | Hseih et al. .......... 428/352 |
| 6,458,449 B1 * | 10/2002 | Parent et al. .......... 428/32.1 |
| 6,652,928 B2 * | 11/2003 | Sato et al. .......... 428/32.12 |

FOREIGN PATENT DOCUMENTS

| | | | |
|---|---|---|---|
| WO | WO 98/45054 | 10/1998 | |
| WO | WO 98/52746 | 11/1998 | |
| WO | WO 99/03929 | 1/1999 | |
| WO | WO 99/07558 | 2/1999 | |
| WO | WO 99/12743 | 3/1999 | |
| WO | WO 99/16419 | 4/1999 | |
| WO | WO 99/22274 | 5/1999 | |
| WO | WO 99/39914 | 8/1999 | |
| WO | WO 99/42296 | 8/1999 | |
| WO | WO 99/55537 * | 11/1999 | .......... B41M/5/00 |
| WO | WO 99/56179 | 11/1999 | |
| WO | WO 99/56682 | 11/1999 | |
| WO | WO 99/65701 | 12/1999 | |
| WO | WO 99/65702 | 12/1999 | |
| WO | WO 99/65703 | 12/1999 | |
| WO | WO 99/65999 | 12/1999 | |
| WO | WO 00/01536 | 1/2000 | |
| WO | WO 00/02735 | 1/2000 | |
| WO | WO 00/47421 | 8/2000 | |
| WO | WO 00/68301 | 11/2000 | |
| WO | WO 00/69647 | 11/2000 | |
| WO | WO 00/71360 | 11/2000 | |
| WO | WO 00/73082 | 12/2000 | |
| WO | WO 00/73083 | 12/2000 | |

* cited by examiner

MEDIA FOR COLD IMAGE TRANSFER

CROSS-REFERENCE TO RELATED APPLICATION

This application is a divisional of U.S. application Ser. No. 09/778,473, filed on Feb. 7, 2001 now abandoned, which is continuation-in-part of U.S. application Ser. No. 09/500,150, filed Feb. 8, 2000, now abandoned.

FIELD OF THE INVENTION

The invention provides improved image transfer media and methods for transferring ink images from the image transfer media to a second substrate at ambient temperature.

BACKGROUND OF THE INVENTION

It is known to transfer images from the imaged medium to another medium using an external heat source such as heated roll or a hot iron. It is also known to transfer images from an image medium to another medium using a process that does not require heat. For example, PCT Publication WO 97/33752 describes a method of transferring a digitized computer images to a second medium. The method describes the use of an inkjet printer to print an image on a laser transparency film, placing the imaged film onto the second medium under pressure and then removing the transparency film. If the transferred image was not satisfactory, the method was to be repeated again using the same image. Although the method is capable of producing high quality transferred images, a high-density image could only be accomplished by repeating the process one or more times, requiring precise registration of each transferred image. In addition, the amount of ink that could be applied to the transfer medium was limited by the substantially smooth laser transparency transfer medium surface since relatively large amounts of ink on the transfer medium were prone to smearing during handling and transfer.

Additionally, the method required that pressure be applied to the back of the transfer medium by burnishing, rollers, or stamps in a substantially vertical manner.

SUMMARY OF THE INVENTION

The present invention is useful for indirect printing of an image by printing an ink image onto an image transfer medium and transferring the image to a second substrate without the application of external heat. The image can be transferred using minimal or low pressure (for example, on the back surface of the transfer medium), and which may be applied with a finger or hand.

In one aspect, the invention provides an image transfer medium that comprises a sheet having an imaging surface, a nonporous micro-embossed surface topography on the imaging surface and an ink release coating on the micro-embossed surface. The nonporous micro-embossed surface topography comprises micro-embossed elements, preferably, cavities and the micro-embossed surface has a surface energy of about 43 dyne/centimeter or less.

In another aspect, the invention provides an indirect method for printing an ink image on a substrate. The method comprises the steps of printing a selected image onto a nonporous imaging surface of an image transfer medium wherein the image transfer medium comprises a sheet having a back surface and a nonporous imaging surface having a micro-embossed surface topography comprising micro-embossed elements on one major surface of the sheet wherein said major surface has a surface energy of about 43 dyne/centimeter or less; contacting the imaged micro-embossed surface with the substrate using pressure on the back of the image transfer medium; and removing the micro-embossed surface of the image transfer medium from the substrate. The method can be used to transfer images made from inks and other materials to another substrate.

A "micro-embossed element" means a recognizable geometric shape that either protrudes or is depressed. "Micro-embossed capacity" means that the imaging surface is capable of receiving at least one drop of inkjet ink within or about each micro-embossed element on the imaging surface. A "micro-embossed" or "microstructured" surface has a topography wherein the average micro-embossed element pitch, that is, center to center distance between features, is from about 1 to about 1000 micrometers and average peak to valley distances of individual features is from about 1 to about 100 micrometers. "Micro-embossing" means embossing a surface and making it a micro-embossed surface. "Nonporous" means that the integral imaging surface of the sheet is not substantially porous to liquid inks. "Ink release coating" means a coating that provides for the release of not only inks but other printed materials as well. "Surface energy" as used herein is equal to the surface tension of the highest surface tension liquid (real or imaginary) that will completely wet a solid with a contact angle of 0 degrees, which may be determined by measuring the critical surface tension from static contact angles of pure liquids using the method of W. A. Zisman described in "Relation of Equilibrium Contact Angle to Liquid and Solid Constitution", *ACS Advances in Chemistry Series* #43, American Chemical Society, 1961, pages 1–51, incorporated by reference herein.

DETAILED DESCRIPTION OF THE INVENTION

Figure 1:
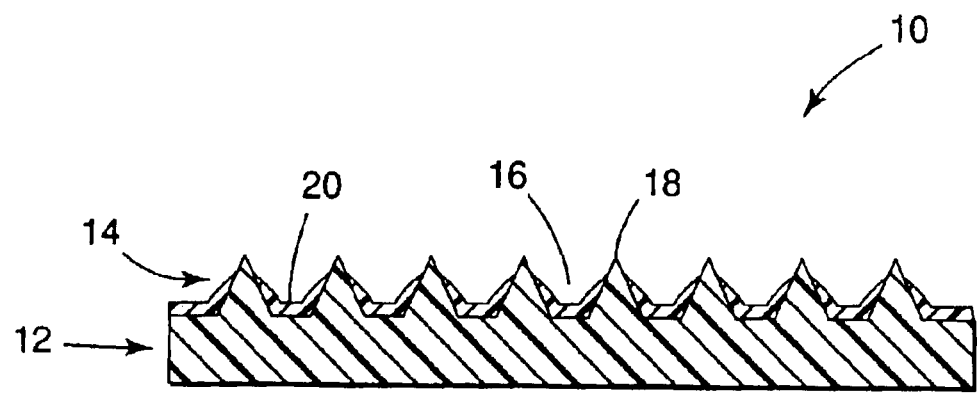
FIG. 1 shows a magnified illustrative cross sectional view of an embodiment of the invention.

FIG. 1 illustrates a preferred embodiment of the present invention: an image transfer medium 10 that is constructed of a sheet 12 having an imaging surface characterized by a micro-embossed image surface topography 14 of multiple wells or cavities 16 and peaks 18 and having a coating of an ink release material 20. The imaging surface of the sheet is nonporous as defined above. The ink release material is used to lower the surface energy of the micro-embossed image surface, which facilitates ink transfer. The image transfer medium 10 is useful for receiving an ink image and protecting the ink image from abrasion, and then capable of transferring the ink to another substrate. FIG. 1 also illustrates an ink drop 30 within one cavity 16 such that the outermost surfaces or peaks 18 of the micro-embossed topography, on a macroscopic level, control placement of the ink drop 30 before transfer.

Sheet 12 used in the image transfer medium can be made from any polymer or combination of polymers capable of being micro-embossed in the manner of the present invention.

The ink release coating is a coating that resides on the micro-embossed surface. The ink release coating may be continuous or discontinuous and is preferably continuous. The purpose or function of the ink release coating is to lower the surface energy of the micro-embossed surface of the image transfer medium, thereby facilitating a more complete transfer of the ink to a second substrate to form an image of high color density to a second substrate. Without the ink release coating, only portions of the image may transfer or only a top portion of the ink contained in each cavity may transfer to the second substrate, requiring perhaps a second ink image printed and transferred. Thus, useful ink release coatings are those coatings that can be applied or migrate to the micro-embossed surface of the sheet to lower the surface energy of the portions of the cavities which ink will contact such that at least 20 percent, preferably at least 50 percent, even more preferably at least 75 percent of the ink is transferred as measured by reflectance color density.

Preferred ink release coatings include compositions comprising silicones, fluorochemicals, and polymers thereof. Alternatively, additives may be incorporated into polymeric materials used for sheets or surfaces of sheets that migrate to the surface of the image transfer medium and provide a low surface energy coating, that is, ink release coating. These additives may be added to thermoplastic and/or thermoset resins that are extruded and micro-embossed to form image transfer media of the invention. Useful surface energy modifying additives include silicone surfactants such as those available from Osi Specialties, Inc., of Danbury, Conn., under the tradename SILWET, and fluorinated surfactants such as those available under the tradename FLUO-RAD FC-1802, etc., available from Minnesota Mining and Manufacturing Company, St. Paul, Minn.

Preferred ink release coatings provide the micro-embossed surface with a surface energy of about 43 dyne/centimeter or less, preferably about 30 dyne/centimeter or less, more preferably about 25 dyne/centimeter or less. Ink release coating materials that will provide surface energies of 43, 30, and 25 dynes/centimeter or less are commercially available.

In general, the choice of geometrical configuration of the specific micro-embossed features does not greatly influence image transfer performance, so long as there is sufficient micro-embossed capacity to control placement of an individual drop of ink. In some preferred embodiments, the geometrical configuration is chosen such that the micro-embossed element pitch (i.e., center to center distance between micro-embossed elements) is less than about 340 micrometers. In further preferred embodiments, the micro-embossed micro-embossed element density of the pattern is such that the cavity walls actually collapse when moderate pressure is applied by hand to effect the transfer of the image.

For example, low density polyethylene walls micro-embossed as an orthogonal grid and having an average wall thickness of 10–25 micrometers, spaced with a micro-embossed element pitch of 338 micrometers, and having square cavities with a depth of 25 micrometers, completely collapse during image transfer with moderate hand pressure. On the other hand, the same low density polyethylene material micro-embossed with an orthogonal grid pattern with walls 10–25 micrometers thick, spaced with a micro-embossed element pitch of 127 micrometers, and having square cavities with a depth of 25 micrometers do not collapse.

In general, the amount of ink transferred from films with collapsible features is superior to those films containing more rigid features. Silicone rubber micro-embossed elements are preferred, since they collapse under pressure, but quickly recover to their original shape when pressure is removed so the film can be used again.

In a preferred embodiment, the micro-embossed imaging surface topology is chosen so that ink droplets printed onto the micro-embossed surface do not protrude above the tops of the micro-embossed elements thereby improving handling properties of imaged sheet.

Figure 2:
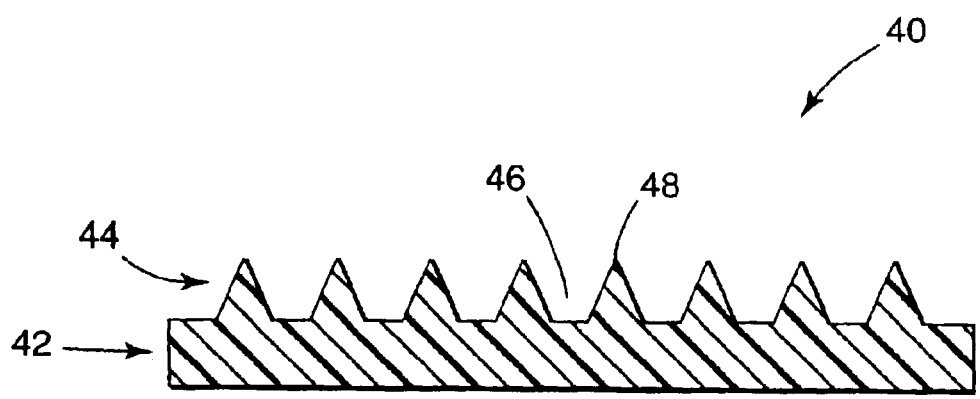
FIG. 2 shows a magnified illustrative cross sectional view of an embodiment of the invention.

In another embodiment, shown in FIG. 2, the image transfer medium 40 is constructed of a sheet 42 having an micro-embossed imaging surface topography 44 of multiple wells or cavities 46 and peaks 48 wherein the micro-embossed or image surface has ink release properties. In this embodiment, the micro-embossed imaging surface itself has ink release properties, that is, the micro-embossed surface has a surface energy that facilitates the transfer of ink from the surface topography without any additional ink release coating added (See FIG. 1). The imaging surface of the sheet is also nonporous as defined above.

Materials having a surface energy in the range of from about 43 dyne/centimeter or less are suitable for use as sheets 42 or as a micro-embossed surface topography 44. Non-limiting examples of materials that provide a suitable surface energy include polymeric materials such as polydimethylsiloxanes, fluorinated polymers, polyolefins (e.g., such as polyethylene, polypropylene, etc.) and polyvinyl chloride. For use with aqueous inks, useful materials have a surface energy of less than about 43 dyne/centimeter, with materials having a surface energy of from about 30 dyne/centimeter or less being preferred. For use with non-aqueous inks (i.e., solvent based or 100 percent solids), materials having a surface energy of from about 30 dyne/centimeter or less are useful, preferably from about 25 dyne/centimeter or less.

Figure 3:
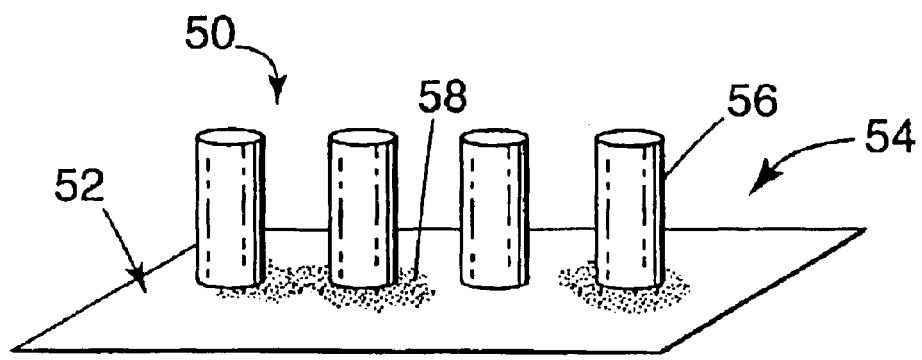
FIGS. 3 and 4 show magnified illustrative cross sectional views of further embodiments of the invention.

In another embodiment, shown in FIG. 3, the image transfer medium 50 is constructed of a sheet 52 having a micro-embossed imaging surface topography 54 of multiple posts 56. The posts may be any protruding geometric shape, for example, circular, oval, trapezoidal, spiral, square, triangular, octagonal, and the like. Preferably, the space between posts is from about 10 to about 1000 micrometers, even more preferably from about 50 to about 800 micrometers and even more preferably from about 200 to about 600 micrometers. Preferably, the height of the posts ranges from about 5 to about 100 micrometers, more preferably from about 10 to about 70 micrometers, even more preferably from about 10 to about 40 micrometers. Preferably, the diameter of the posts ranges from about 10 to about 150 micrometers, more preferably from about 10 to about 100 micrometers and even more preferably from about 30 to about 90 micrometers. Preferably, the density of the posts ranges from about 1 to about 40 posts per square millimeter, more preferably from about 2 to about 20 posts per square millimeter and even more preferably from about 2 to about 10 posts per square millimeter. As shown above sheet 52 may be made from a material that provides an ink release property to the imaging surface. Alternatively, an ink release coating may be coated onto the imaging surface.

Figure 4:
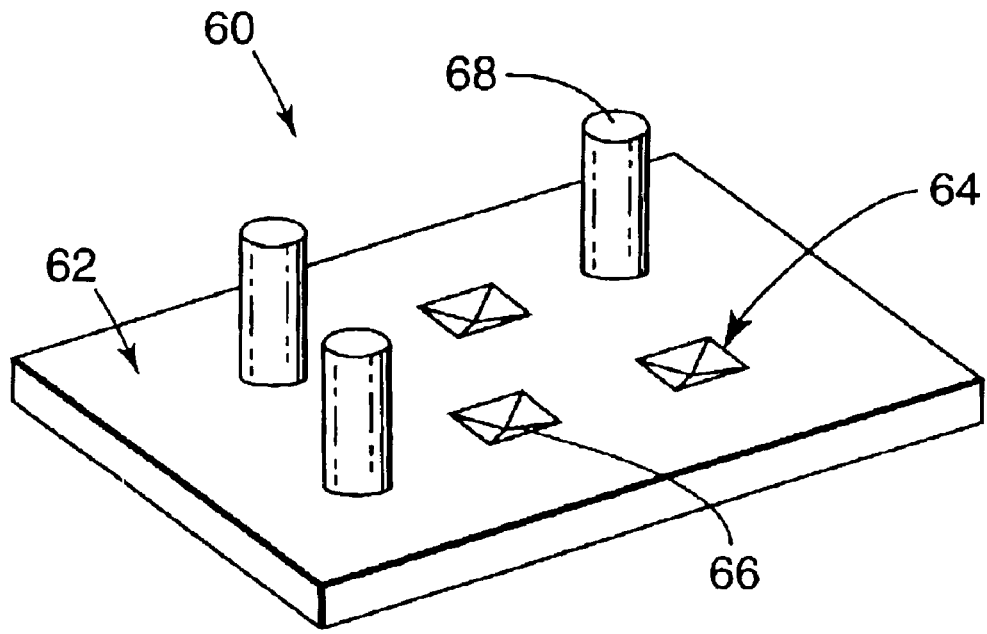

In another embodiment shown in FIG. 4, the image transfer medium 60 is constructed of a sheet 62 having a micro-embossed imaging surface topography 64 of wells or cavities 66 and posts 68. The cavities are spaced such that they provide control over the placement of the ink droplets while the posts are spaced to prevent accidental smearing of the wet ink. Preferably, the pitch of the cavities is finer than the pitch of the posts. However, the pitch of the cavities when combined with the posts can typically be wider than the pitch of cavities alone since the posts prevent the wet image from smearing during handling. The posts may also be applied in a random manner to an imaging substrate having cavities such that some of the posts are within a cavity. The height of the posts may or may not exceed the height of the walls of the cavities. As described above, the imaging surface may be constructed of a material that provides an ink release property of the imaging surface may be coated with an ink release coating.

The sheets described in FIGS. 1–4 can be a solid film. The sheets may be transparent or translucent, clear or tinted, or optically transmissive. The sheets 12 and 42 are preferably transparent.

Nonlimiting examples of polymeric films useful as sheets in the present invention include thermoplastics such as polyolefins (for example, polyethylene, polypropylene, polybutylene, copolymers of styrene and butadiene, copolymers of ethylene and propylene, etc.); poly(vinyl chloride); hydrolyzed or unhydrolyzed copolymers of ethylene with vinyl acetate; polycarbonates; norbornene copolymers; fluorinated thermoplastics such as copolymers and terpolymers comprising hexafluoropropylene, vinylidene fluoride, tetrafluoroethylene, or vinyl fluoride, and surface modified versions thereof, poly(ethylene terephthalate) and copolymers thereof, polyurethanes, polyimides, acrylics, and filled versions of the above using fillers such as silicates, aluminates, feldspar, talc, calcium carbonate, titanium dioxide, and the like. Also useful in the application are non-wovens, coextruded films, and laminated films made from the materials listed above. A person of ordinary skill in the art can easily measure the surface energy of any of the above films to determine whether the films provide a suitable surface energy for use in an image transfer media described by FIG. 2 and the accompanying text.

More specifically, polyolefins can be ethylene homopolymers or copolymers, such as "7C50" brand ethylene propylene copolymer commercially available from Union Carbide Co. of Houston, Tex. Other specifically useful films include "LEXAN" polycarbonate from General Electric Plastics of Pittsfield, Mass., "ZEONEX" polymer from B. F. Goodrich of Richfield, Ohio, fluoropolymers such as "THV-500" and "THV 250" polymers from Dyneon LLC of Oakdale, Minn., plasticized poly(vinyl chloride), poly(ethylene terephthalate) copolymer "EASTAR" 6763 from Eastman Chemical Co. of Kingsport, Tenn., "AFFINITY" PL 1845 from Dow Chemical Co. of Midland, Mich., and SURLYN™ acrylic acid copolymers from E. I. Du Pont de Nemours and Co. of Wilmington, Del.

In further embodiments of sheets shown in FIGS. 1–4, any sheet suitable for feeding into an inkjet printer may be further coated, laminated, or co-extruded with one or more of the polymers suitable for use in polymeric films of according to the invention and further micro-embossed (and, if necessary, coated with an ink release material as described herein) to provide image transfer media of the invention. Non-limiting examples of such sheets are papers, including for example xerographic grade papers, specialty inkjet papers, and coated papers, etc.; nonwoven materials, including for example spunbond polyolefins, etc.; card stock; envelopes; etc.

Thermoset materials are also additionally useful as materials for sheets or micro-embossed imaging surface topographies that have ink release properties without the use of an ink release coating. For example, reactive silicones (either two-part or moisture curable, UV-curable materials (e.g., acrylate mixtures) may be applied to a micro-embossed roll, cured and removed from the roll to give an micro-embossed film having an inverse image of the roll.

The structure of the micro-embossed surface topography can be any structure that provides cavities that will each hold at least 10 pL of ink. For example, the topographies for the cavities can range from the extreme of cubic cavities with parallel vertical, planar walls, to the extreme of hemispherical cavities, with any possible solid geometrical configuration of walls in between the two extremes. Specific examples include conical cavities with angular, planar walls, truncated pyramid cavities with angular, planar walls, and cube corner shaped cavities. Other useful micro-embossed structures are described in PCT publications WO 00/73082 and WO 00/73083, incorporated by reference herein for the micro-embossed structures and methods of making micro-embossed substrates.

The pattern of the topography can be regular, random, or a combination of the two. "Regular" means that the embossing pattern is planned and reproducible regardless of the pattern of the embossing. "Random" means one or more features of the micro-embossed elements are intentionally and/or systematically varied in a non-regular manner. Examples of features that are varied include for example, micro-embossed element pitch, peak-to-valley distance, depth, height, wall angle, edge radius, and the like. Combination patterns may for example comprise patterns that are random over an area having a minimum radius of ten cavity widths from any point, but these random patterns can be reproduced over larger distances within the overall pattern.

More than one drop of ink may be contained in a cavity because the mixing of the colors cyan, yellow, and magenta are required to create the infinite number of colors demanded in the inkjet industry. Thus, the volume of the cavities should be capable of holding as many as three drops of different colors of ink. The volume of a cavity can range from about 1 to about 20,000 pL, preferably from about 1 to about 10,000 pL, more preferably from about 3 to about 1,000 pL, even more preferably from about 30 to about 10,000 pL, and even more preferably from about 300 to about 10,000 pL.

For applications in which desktop inkjet printers (typical drop size of 3–20 pL) will be used to generate the image, cavity volumes of from about 1000 to about 3000 pL are preferred. For applications in which large format desktop inkjet printers (typical drop size of 10–200 pL) will be used to generate the image, cavity volumes of from about 3,000 to about 10,000 pL are preferred.

Another way to characterize the structure of the cavities is to describe the cavities in terms of aspect ratios. An "aspect ratio" is the ratio of the depth to the width of the cavity. Useful aspect ratios range from about 0.01 to about 2, preferably from about 0.05 to about 1, and more preferably from about 0.05 to about 0.3.

The overall depth of the cavities depends on the shape, aspect ratio, and desired volume of the cavities. For a cubic-shaped cavity, the depth ranges from about 5 to about 100 micrometers. For a hemispherical-shaped cavity, the depth ranges from about 7 to about 100 micrometers. The depths of other geometrically shaped cavities reside in between these two extremes for a given volume.

Micro-embossed element pitch of the micro-embossed image transfer media of the invention are in the range of from 1 to about 1000 micrometers, preferably from 10 to about 500 micrometers, more preferably from about 50 to about 400 micrometers. It is recognized that in some embodiments of the invention, it may not be necessary, or desirable, that uniform micro-embossed element pitch be observed between micro-embossed elements, nor that all features be identical. Thus, an assortment of different types of features, for example, cavities or wells with, perhaps, an assortment of micro-embossed element pitches may comprise the micro-embossed surface of the image transfer media according to the invention.

Image transfer media of the invention may be prepared and used in many dimensions. Useful lengths may be from about 1 centimeter up to 2,000 meters or even longer (especially when used in roll form). Useful widths may be from about 0.5 centimeter up to about 250 centimeters or even wider. Useful thicknesses of image transfer media of the invention may range from about 25 micrometers up to 0.5 millimeter or even higher so long as the material may be printed by inkjet means.

The image transfer media of the invention may also optionally have an ink receptive coating on the micro-embossed imaging surface. The ink receptive coating may comprise one or more layers. The purpose of the ink receptive coating is to limit migration of colorant both prior to and after subsequent image transfer. The ink receptive coating may be used on any image transfer media described in this application.

Useful ink receptive coatings are hydrophilic and aqueous ink sorptive. Such coatings include, but are not limited to, polyvinyl pyrrolidone, homopolymers and copolymers and substituted derivatives thereof; vinyl acetate copolymers, for example, copolymers of vinyl pyrrolidone and vinyl acetate, copolymers of vinyl acetate and acrylic acid, and the like, and hydrolyzed derivatives thereof; polyvinyl alcohol, acrylic acid homopolymers and copolymers; co-polyesters such as the VITEL co-polyesters including VITEL-2700B co-polyester available from Bostick, Middleton, Mass.; acrylamide homopolymers and copolymers; cellulosic polymers; styrene copolymers with allyl alcohol, acrylic acid, and/or maleic acid or esters thereof; alkylene oxide polymers and copolymers; gelatins and modified gelatins; polysaccharides, and the like, as disclosed in U.S. Pat. Nos. 5,766,398; 4,775,594; 5,126,195; and 5,198,306. Vinyl pyrrolidone homopolymers and copolymers are preferred.

Optionally, the ink receptive coatings may also include additives that provide a visual property to the transferred image. Such additives include glitter, glass bubbles, pigments, mica, UV absorbers and stabilizers, etc.

Additionally, the image transfer media of the invention may also have one or more surfactants coated onto the micro-embossed imaging surface. Examples of useful surfactants include those described in U.S. Pat. No. 5,932,355 at column 7, lines 22–31, incorporated by reference in this application.

The transfer medium 10 optionally has an adhesive layer on the major surface of the sheet opposite micro-embossed image surface 12 that is also optionally but preferably protected by a release liner. After imaging, the receptor medium 10 can be adhered to a rigid substrate before image transfer.

The choice of adhesive and release liner depends on usage desired for the image graphic.

Pressure-sensitive adhesives can be any conventional pressure-sensitive adhesive that adheres to both the polymer sheet and to the surface of the item upon which the transfer medium having the precise image is to be placed. Pressure-sensitive adhesives are generally described in Satas, Ed., *Handbook of Pressure Sensitive Adhesives* 2nd Ed. (Von Nostrand Reinhold 1989), the disclosure of which is incorporated by reference. Pressure-sensitive adhesives are commercially available from a number of sources. Particularly preferred are acrylate pressure-sensitive adhesives commercially available from Minnesota Mining and Manufacturing Company, and generally described in U.S. Pat. Nos. 5,141,790; 4,605,592; 5,045,386; and 5,229,207; and EPO Patent Publication EP 0 570 515 B1.

Release liners are also well known and commercially available from a number of sources. Nonlimiting examples of release liners include silicone coated kraft paper, silicone coated polyethylene coated paper, silicone coated or non-coated polymeric materials such as polyethylene or polypropylene, as well as the aforementioned base materials coated with polymeric release agents such as silicone urea, fluorinated polymers, urethanes, and long chain alkyl acrylates, such as defined in U.S. Pat. Nos. 3,957,724; 4,567,073; 4,313,988; 3,997,702; 4,614,667; 5,202,190; and 5,290,615; the disclosures of which are incorporated by reference herein and those liners commercially available as POLYSLIK brand liners from Rexam Release of Oakbrook, Ill., and EXHERE brand liners from P.H. Glatfelter Company of Spring Grove, Pa.

Method of Forming Micro-Embossed Image Surface

The micro-embossed imaging surface can be made from any contacting technique such as casting, coating, or compressing techniques. More particularly, micro-embossing can be achieved by at least any of (1) casting a molten thermoplastic using a tool having a pattern, (2) coating of a fluid onto a tool having a pattern, solidifying the fluid, and removing the resulting micro-embossed solid, or (3) passing a thermoplastic film through a nip roll to compress against a tool having that micro-embossed pattern. Desired embossing topography can be formed in tools via any of a number of techniques well-known to those skilled in the art, selected depending in part upon the tool material and features of the desired topography. Illustrative techniques include etching (e.g., via chemical etching, mechanical etching, or other ablative means such as laser ablation or reactive ion etching, etc.), photolithography, stereolithography, micromachining, knurling (e.g., cutting knurling or acid enhanced knurling), scoring or cutting, etc.

Alternative methods of forming the micro-embossed image surface include thermoplastic extrusion, curable fluid coating methods, and embossing thermoplastic layers which can also be cured.

Compressing Method

This method uses a hot press familiar to those skilled in the art of compression molding.

The pressure exerted in the press typically ranges from about 48 kPa to about 2400 kPa.

The temperature of the press at the mold surface typically ranges from about 100° C. to about 200° C. and preferably from about 110° C. to about 150° C.

The dwell time of pressure and temperature in the press typically ranges from about 1 to about 5 minutes. The pressure, temperature and dwell time used depend primarily on the particular material being micro-embossed, as is well known to those skilled in the art. The process conditions should be sufficient to cause the material to flow and faithfully take the shape of the surface of the tool being used. Any generally available commercial hot press may be used, such as Wabash Model 20-122TM2WCB press from Wabash MPI of Wabash, Ind.

Extrusion Method

A typical extrusion process for the present invention involves passing an extruded material or preformed substrate through a nip created by a chilled roll and a casting roll having a surface having a random pattern inverse of desired micro-embossed image surface, with the two rolls rotating in opposite directions.

Single screw or twin screw extruders can be used. Conditions are chosen to meet the general requirements which are understood to the skilled artisan. Representative but non-limiting conditions are outlined below.

The temperature profile in the extruder can range from 100° C. to 250° C. depending on the melt characteristics of the resin.

The temperature at the die ranges from 150° C. to 230° C. depending on the melt strength of the resin.

The pressure exerted in the nip can range from about 140 to about 1380 kPa and preferably from about 350 to about 550 kPa.

The temperature of the nip roll can range from about 5° C. to about 150° C. and preferably from about 10° C. to about 100° C., and the temperature of the cast roll can range from about 25° C. to about 100° C. and preferably about 40° C. to about 60° C.

The speed of movement through the nip typically ranges from about 0.25 to about 10 m/min and preferably as fast as conditions allow.

Nonlimiting examples of equipment useful for this extrusion method include single screw extruders such as a 1¼ inch KILLION extruder, available from Killion Extruders, Inc. of Cedar Grove, N.J., equipped with a gear pump such as a ZENITH gear pump, available from Parker Hannifin Corp., Zenith Pumps Division of Sanford, N.C., to control flow rate; co-rotating twin screw extruders such as a 25 millimeters BERSTORFF extruder, available from Berstorff Corporation of Florence, Ky.; and counter-rotating twin screw extruders such as a 30 millimeters LEISTRITZ extruder, available from American Leistritz Extruder Corporation of Somerville, N.J. Flow rate in the twin screw extruder can be controlled using weight loss feeders such as a K-TRON extruder, available from K-tron America of Pitman, N.J., to feed the raw material into the extruder. A film die with adjustable slot is used to form a uniform film out of the extruder.

Calendering may be accomplished in a continuous process using a nip, as is well known in the film handling arts. In the present invention, a web having a suitable embossable thermoplastic exposed layer, and having sufficient thickness to receive the desired pattern is passed through a nip formed by two cylindrical rolls, one of which has an inverse image to the desired embossing engraved into its surface. The embossable thermoplastic exposed layer must contact the engraved roll at the nip. Sufficient heating to temperatures of from 100° C. up to 540° C. of the web so that embossing may occur may be supplied to the web prior to reaching the nip by radiant heat sources (e.g., heat lamps, infrared heaters, etc.) and/or by use of heated rolls at the nip. A combination of heat and pressure at the nip (typically, 100 to 500 lb/inch (1.8 kg/centimeter to 9 kg/centimeter)) is generally used in the practice of the present invention.

The image transfer media of the invention are useful for receiving an ink image and then transferring that image to another substrate. The transfer of the image is a "cold transfer" in that no external heat is required to transfer the image and the image is transferred at ambient temperature. Generally, an image is printed onto the micro-embossed surface of the image transfer media. The image transfer media is then applied to a second substrate, image side down, and pressure is applied to the back of the image transfer medium such that the ink image is transferred to the second substrate. Then the image transfer medium is removed from the second substrate.

The image to be transferred is first preferably selected on a computer. After the image is selected, the image is manipulated or modified as desired on the computer. Examples of image manipulation include reversing, rotating, reducing, distorting, adjusting color, removing or adding background, removing or adding foreground, removing or adding images, and adjusting the brightness of the image. Then the image is printed onto the image transfer medium of the invention.

The image is preferably applied to the image transfer medium using inkjet printing techniques. Nonlimiting commercially available examples include thermal inkjet printers such as DESKJET brand, PAINTJET brand, DESKWRITER brand, DESIGNJET brand, and other printers commercially available from Hewlett Packard Corporation of Palo Alto, Calif., and the NovaJet brand wide format printers commercially available from Encad, Inc., of San Diego, Calif. Also included are piezo type inkjet printers such as those from Seiko-Epson, Raster Graphics, and Xerox, spray jet printers and continuous inkjet printers. Any of these commercially available printing techniques introduce the ink in a jet spray of a specific image into the medium of the present invention. Any of the above printers can be attached to a computer so to print computer generated images.

The image transfer media of the invention can be used with a variety of inkjet inks obtainable from many commercial sources. It should be understood that each of these inks has a different formulation, even for different colors within the same ink family. Nonlimiting sources include Minnesota Mining and Manufacturing Company, Encad Corporation, Hewlett Packard Corporation, NuKote, and the like. These inks are preferably designed to work with the inkjet printers described above, although the specifications of the printers and the inks will have to be reviewed for appropriate drop volumes and dote per inch (dpi) in order to further refine the usefulness of the present invention.

Once the image has been printed onto the transfer medium, the image can be transferred to a second medium. The image may be transferred to any substrate capable of receiving the ink image. Specific examples include cloth, wood, gypsum or sheet rock (either painted or unpainted), plastics, glass, for example windows, metals, ceramics, stone, painted surfaces such as walls, paper, cardboard, and the like. Once the image transfer medium is placed onto the second substrate, pressure is applied to the back of the transfer medium. The pressure is preferably applied by hand, but may be applied using rollers, stamps, or any other means of applying substantially vertical pressure to the back of the transfer medium. After sufficient pressure has been applied to the back of the transfer medium, the transfer medium is removed from the second substrate and the image transfer has been completed.

Image transfer media of the present invention can also be employed with other jettable materials, i.e., those materials capable of passing through an inkjet printing head. Nonlimiting examples of jettable materials include adhesives, biological fluids, chemical assay reagents, pharmaceuticals, particulate dispersions, waxes, and combinations thereof.

Image transfer media of the present invention can also be employed with non-jettable materials so long as an inkjet printing head is not needed to deposit the material on the micro-embossed surface. For example, U.S. Pat. No. 5,658,802 (Hayes et al.) discloses printed arrays for DNA, immunoassay reagents or the like using arrays of electromechanical dispensers to form extremely small drops of fluid and locate them precisely on substrate surfaces in miniature arrays.

EXAMPLES

"TESLIN" is a trade designation for silica-filled high density polyethylene having very small pore sizes (typically 0.02–0.5 micrometers), available from PPG Industries of Pittsburgh, Pa.

"HP-870C", "HP855Cse", "HP680C", and "HP2000C" are trade designations for desktop thermal inkjet printers, and "HP GLOSSY PAPER" is a trade designation for a thermal inkjet printer paper, all available from Hewlett-Packard Corp.

"HP51645A" and "HP51641A" inks were used with "HP-870C" printer; "HP51641A" and "HP51645A" inks were used with "HP855Cse" printer; "HP51649A" and "HP51641A" inks were used with "HP680C" printers; and "HP Part No. 10" ink was used with "HP2000C" printer.

7C50 is a trade designation for ethylene-propylene copolymer, available from the Union Carbide Corp.

"THV FLUOROPOLYMER THV-200" is a trade designation for fluorinated polymer film, available from Dyneon, LLC.

"PETG" copolyester film is available from Eastman Chemical.

"SCOTCHCAL WHITE GRAPHIC MARKING FILM" is a trade designation for PVC film, available from the Minnesota Mining and Manufacturing Company.

"3M FINE GRADE SANDING SPONGE" was obtained from Minnesota Mining and Manufacturing Company.

"PVP/VA S-630" is a trade designation for a powdered form of poly(vinylpyrrolidone-co-vinyl acetate); VIVIPRINT 111 is a trade designation for a 10 weight percent solids hydrophilic acrylic polymer in water having amine functionality, both are available from International Specialty Products of Wayne, N.J.

Mayer Rods (i.e., wire-wound rods) are available from R D Specialties, Inc. of Webster, N.Y.

"SILICONE SPRAY MOLD RELEASE" is a trade designation for a silicone spray release agent, available from IMS Company, Inc. of Chagrin Falls, Ohio.

"SILASTIC J" and "SILASTIC E" are trade designations for curable RTV silicone elastomers, available from Dow Corning Co. of Midland, Mich.

"MICROPRINT MULTI-SYSTEM" paper and Xerographic grade paper (20 lb. paper) are available from Georgia Pacific Corp.

Silicone coated LDPE/PET/HDPE (i.e., low density polyethylene/polyethylene terephthalate/high density polyethylene) film surface and polyethylene coated paper each having a thin silicone topcoat on the LDPE surface, are available from Rexam Release.

"GRETAG SPM 55 REFLECTANCE DENSITOMETER" is available from Gretag-Macbeth of Gastonia, N.C.

"LEXMARK Z11" is a trade designation for a thermal inkjet printer, available from Lexmark International of Lexington, Ky. Ink used with this printer was Lexmark Part No. 12A1980.

"EPSON STYLUS COLOR" is a trade designation for a thermal inkjet printer, available from US Epson, Inc. of Torrance, Calif. Ink used with this printer was Epson Part Nos. S020034 and S020036.

The 100 percent cotton T-shirt cloth used in the examples was "HANES SPECIAL-TEE BRAND", 100 percent combed cotton (white), available from Hanes Companies of Winston Salem, N.C. and had a thickness of 0.203 millimeter and basis weight of 104 g/m$^2$.

"NAFION SE-20092" is a trade designation for perfluorinated vinyl ether having sulfonic acid functionality/tetrafluoroethylene copolymer as a 20 weight percent solids in ethanol/isopropanol/water, available from E.I. du Pont de Nemours Co.

"ASPEN SELECT GRADE HOBBY WOOD" is a trade designation for aspen, which has been sanded smooth for use by hobbyists and it or equivalents may be obtained at hobby and craft stores.

"DISPAL 23N4-20" and "DISPAL 11N7-12" are trade designations for an aqueous alumina dispersion, available from Vista Chemical Co. of Houston, Tex.

"FREESOFT 970" is a trade designation for an aqueous silicone polymer emulsion (20 weight percent solids), available from B.F. Goodrich Co.

"WYP-ALL" is a trade designation for heavy-duty paper wipers, available from Scott Paper Co. of Van Nuys, Calif.

Isopropanol and denatured ethanol were obtained from E.M. Science of Gibbstown, N.J.

"VITEL-2700B" is a trade designation for a co-polyester, available from Bostick, Middleton, Mass.

"AIRFLEX 460" is a trade designation for a 63 weight percent solids in water vinyl acetate-ethylene copolymer emulsion available from Air Products and Chemicals of Allentown, Pa.

Ink transfer was calculated by measuring color density of the imaged ink transfer medium before and after transfer using a Gretag SPM 55 REFLECTANCE DENSITOMETER. Percent ink transfer was calculated according to the following equation:

Percent ink transfer=(reflective optical density of material receiving image)/(reflective optical density of material receiving image)+(reflective optical density of remainder on transfer sheet)×100 percent.

The following patterns were used in many of the examples, which follow and are referred to as Pattern 1 and Pattern 2. Both patterns were micro-embossed by calendering of a continuous web of the materials to be micro-embossed using a corresponding engraved roll having an inverse image as the roll contacting the micro-embossed side of the web, unless otherwise specified.

Pattern 1 is a "75 LPI" pattern referred to in the examples as an array of square cavities that are 25 micrometers deep and having a micro-embossed element pitch of 332 micrometers and walls that are 9 micrometers thick at their top and 22 micrometers thick at their base.

Pattern 2 is a "130 LPI" pattern of square cavities of 197 micrometers micro-embossed element pitch, cavity depth of 15 micrometers, and included wall angle of 60°. The wall thickness is 20 micrometers at the bottom of the cavity. Additionally, at the center of the bottom of this cavity resides a second cavity that increases the total volume of the structure. This second cavity is pyramid shaped (four sides proceeding to a point at the deepest point of the two-cavity structure). It is 38 micrometers wide at the opening, and is 10 micrometers deep with a 125° included angle of descent.

Example 1

A solution was prepared by diluting 2 parts NAFION SE-20092 (perfluorinated vinyl ether having sulfonic acid functionality/tetrafluoroethylene copolymer as a 20 weight percent solids in ethanol/isopropanol/water) with a solution consisting of 10 parts ethanol, 5 parts isopropanol, 1 part water. This solution was coated with a #4 Mayer Rod (0.0091 millimeter nominal wet thickness) onto silicone coated LDPE/PET/HDPE film having Pattern 2 micro-embossed thereon and dried for 15 minutes in an oven at 70° C.

The coated film was imaged with a test pattern of solid block colors and lines contained in the blocks using an EPSON STYLUS COLOR inkjet printer operating in 720 dpi mode and using the recommended aqueous inks (i.e., the black ink cartridge was Epson Part No. S020034, and the color ink cartridge was Epson Part No. S020036). The film was individually applied to MICROPRINT MULTI-SYSTEM paper so as to contact the ink image with the paper. Moderate hand pressure was applied to the unimaged side of the film so to effect transfer of the image to the paper, and the film was subsequently removed.

The image transferred from this micro-embossed film had very good image quality characterized by sharp edges, good color density, and color uniformity.

Comparative Example 1

Figure 5:
FIGS. 5–17 are magnified digital images of imaged comparative examples, imaged examples, and image transfer media of the invention.

Black pigmented solvent borne ink (3M Commercial Graphics Division Ink #3700 series) was jetted directly onto plain aluminum panels using 1.4 centimeters high boldface type to form the characters "3M" using a piezoelectric printhead (MIT) equipped with 128 nozzles, available from Modular Ink Technology of Stockholm, Sweden, jetting 70 pL drops at 195×195 dpi and then dried at ambient temperature for about 30 minutes. The resultant magnified printed image is shown in FIG. 5.

Comparative Example 2

An unembossed sheet of fluoropolymer film (THV 200 film) was printed as described in Comparative Example 1. The imaged side of film was immediately applied to an aluminum panel, and the unimaged side of the film was rolled 3–4 times with firm hand pressure using a rubber roller. The film was removed, leaving behind an imaged aluminum panel shown in FIG. 6 in magnified form.

Example 2

A crosslinked silicone mold (SILASTIC J) having an inverse image of the resulting pattern was compression molded against a sheet of fluoropolymer film (THV 200 film) to micro-emboss a pattern of cavities 25 micrometers deep and 250 micrometers from center to center, with walls 25 micrometers thick at the base of the wall and a 15° included wall angle, onto the substrate; the structure was confirmed in each case using standard interferometry techniques. The imaged side of the micro-embossed film was printed as described in Comparative Example 1, and immediately applied to an aluminum panel and the backside of the film was rolled 3–4 times with firm hand pressure using a rubber roller. The film was removed, leaving behind an imaged aluminum panel shown in FIG. 7 in magnified form.

Figure 6:
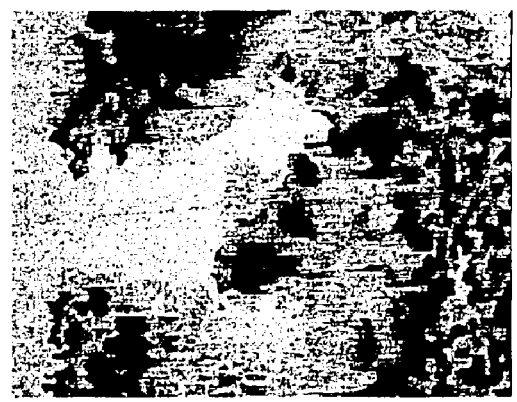
Figure 7:

FIGS. 6–7 clearly show that the micro-embossed film was much more effective at transferring an ink image to a substrate than was a flat film.

FIGS. 5 and 7 show that image quality of the transferred image approaches that of direct printing.

Examples 3a and 3b show the improvement in image quality observed when a fabric substrate is dampened prior to image transfer.

Example 3a

An array of 25 micrometer deep truncated square pyramidal cavities that had a micro-embossed element pitch of 50 micrometers were micro-embossed into a piece of PETG film. The micro-embossed pattern was made by compression molding a PETG film with heating against a SILASTIC J master having the inverse pattern. The cavities were surrounded by walls that were 4 micrometers thick at their tops and 16 micrometers thick at their base. A thin layer of SILICONE SPRAY MOLD RELEASE was applied to the micro-embossed surface of this film using a spray bottle. The micro-embossed surface was then imaged using an HP855Cse ink jet printer with the print driver set to the best quality setting (i.e., HP Glossy Paper Media Setting). The imaged surface of the transfer film was intimately contacted with a dry 100 percent cotton cloth and moderated pressure was applied to the backside of the transfer film to effect transfer of the image to the cotton fabric.

Example 3b

The exact procedure described in Example 3a was repeated, except the 100 percent cotton cloth was moistened with deionized water and wrung out by hand prior to transfer of the wet ink image. The moistened cotton cloth contained approximately 118 grams of water per square meter.

Table 1 shows data on the percentage of ink transferred for both of the aforementioned examples. Reflected color density measurements used to calculate the percent ink transfer were made using a Gretag SPM 55 REFLECTANCE DENSITOMETER.

TABLE 1

| Substrate | Percent Ink Transfer | | | |
|---|---|---|---|---|
| | Black | Magenta | Cyan | Yellow |
| Example 3a (Dry Cotton) | 27 | 74 | 75 | 75 |
| Example 3b (Damp cotton) | 90 | 98 | 98 | 97 |

Example 4

Silicone treated polyethylene coated paper was micro-embossed with a pattern of square cavities by compression molding the film against a nickel plate whose surface consisted of a square grid of intersecting 25.4 micrometer deep grooves. The grooves in the plate were spaced with a micro-embossed element pitch of 79 lines per centimeter and were nominally 25.4 micrometers wide.

A Hewlett-Packard HP-870C desktop ink jet printer was used to image the films with a pattern that included square regions of black and each of the three secondary colors (using paper mode, best quality settings). The imaged surface of the film was intimately contacted with a 100 percent cotton fabric and moderate finger pressure was applied to the unimaged film surface to effect transfer of the image to the fabric.

Example 5

A micro-embossed silicone rubber film was produced by applying a 0.41 millimeter thick coating of SILASTIC E silicone rubber material with a knife coater to the nickel plate of Example 4. The freshly applied SILASTIC E silicone rubber material was degassed in a vacuum oven for approximately one hour and allowed to cure fully while still covering the nickel plates. The cured film was then carefully removed from the nickel plates. The film was imaged and the image transferred to cotton as in Example 4.

Images produced using the silicone rubber film of Example 5 were superior in terms of their image density and color uniformity, to those produced in Example 4. Table 2 compares the transferred color density of Example 4 to that of Example 5.

The image densities shown in Table 2 were measured using a GRETAG SPM 55 densitometer. For the secondary colors, the two entries in each cell represent the CMYK components that are the most intense for each color.

All images were of acceptable quality, but images resulting from use of the flexible silicone elastomer film of Example 5 were even better than those of Example 4.

TABLE 2

| Transfer Substrate | Black | Red (M, Y) | Green (C, Y) | Blue (C, M) |
|---|---|---|---|---|
| Example 4 | 0.42 | 0.52, 0.52 | 0.53, 0.50 | 0.55, 0.44 |
| Example 5 | 1.18 | 0.78, 0.79 | 0.8, 0.69 | 0.66, 0.85 |

Example 6

Silicone treated polyethylene coated paper sheets, micro-embossed with Pattern 1, were printed with a LEXMARK Z11 inkjet printer (tricolor ink cartridge, Lexmark Part No. 12A1980, settings for high resolution print quality), and successfully used to transfer ink images to the following surfaces as described in Example 4 above: paper mache gift box, cotton T-shirt, polystyrene foam, pine wooden picture frame surface, TESLIN film, and painted drywall surface.

Example 7

This example illustrates the effect of microstructure on image transfer quality.

Polyethylene coated paper having a thin silicone topcoat was embossed by pressing it against a nickel plate with an orthogonal grid of intersecting grooves in a compression molding apparatus. The grooves in the plate were 25.4 micrometers deep, nominally 10 micrometers wide and spaced with a micro-embossed element pitch of 29.5 lines per centimeter. Embossed film samples with various cavity depths were produced by systematically varying the residence time of each of the film samples in the compression molding apparatus.

After removal from the compression molding apparatus, this resultant film (micro-embossed with the inverse image of the nickel plate) was used as the image transfer film. An image containing coverages of 60 percent and 100 percent solid blocks of color, as well as resolution lines in blocks of color, was printed using a Hewlett-Packard HP855Cse printer (black ink cartridge was Hewlett-Packard Part No. 51645A, tricolor ink cartridge was Hewlett-Packard Part No. 51641A, HP Glossy Paper media setting). The wet image was transferred to plain xerographic paper. Results are shown in Table 3.

TABLE 3

| Depth Of Pattern (Micrometers) | Lines/ Centimeter | Compression Molding Conditions (Temperature/Pressure/ Time) | Results |
|---|---|---|---|
| 5–6 micrometers | 30 | 110° C./114 kPas/ 1 min. | Blotchy transfers, Poor resolution |
| 10–12 micrometers | 30 | 110° C./ 114 kPas 110° C./ 2 min. | Fair transfer in colors: best for primary, 60 percent coverage, loss of resolution |
| 23 micrometers | 30 | 110° C./ 114 kPas 110° C./ 4 min. | Good transfer, except for black, which was fair |
| 25 micrometers | 30 | 110° C./ 114 kPas 110° C./ 5 min. | Good transfer, except for black, which was fair |

Example 8

This example shows the effect on transfer image quality of letting the wet ink image stay on the image transfer film for various times.

A truncated pyramidal pattern having the micro-embossed pattern of Example 3a was micro-embossed into PETG copolyester films and sprayed with a silicone spray in similar manner to the procedure of Example 3a. The surface of the micro-embossed films were imaged using an EPSON STYLUS COLOR inkjet printer operating in 720 dpi mode, and Coated 720×720 Media setting and using the manufacturer's recommended ink cartridges (all were aqueous dye based inks). The films were individually applied to xerographic paper so as to contact the ink image with the paper. Moderate hand pressure was applied to the unimaged side of the transfer film to effect transfer of the image to the paper, and then the image transfer film was removed. The results for various times that the ink sat before transfer are shown below in Table 4.

TABLE 4

| Elapsed Time between image and transfer to paper | Results |
|---|---|
| Immediate (less than 1 min.) | Excellent transfer, excellent uniformity and resolution |
| 2 hours | Very good (>90 percent of ink) transfer, some mottle, significant loss of resolution |
| 20 hours | Very good transfer, some mottle, some loss of resolution |

Example 9

A crosslinked silicone mold (SILASTIC J) having an inverse image of the desired pattern was compression molded with 7C50 (ethylene-propylene copolymer) and THV 200 (fluoropolymer film) to emboss a pattern of cavities 25 micrometers deep and 250 micrometers from center to center, with walls 25 micrometers thick at the base of the wall and a 15° included wall angle, onto the substrates; the structure was confirmed in each case using standard interferometry techniques.

SCOTCHCAL™ WHITE GRAPHIC MARKING FILM was micro-embossed with a square array of cavities (0.250 millimeter micro-embossed element pitch, 0.050 millimeter deep micro-embossed and surrounded by walls that were nominally 0.025 millimeter wide). This micro-embossed pattern was made by compression molding a SCOTCHCAL™ WHITE GRAPHIC MARKING FILM against a KAPTON polyimide master having an inverse image and prepared by laser ablation.

Each patterned substrate was subsequently printed upon with an Hewlett-Packard HP855Cse (black ink cartridge was Hewlett-Packard Part No. 51645A, tricolor ink cartridge was Hewlett-Packard Part No. 51641A) and HP2000C (for ink cartridges yellow, magenta, cyan, black Hewlett-Packard Part No. 10) desktop printers. In each case, the print pattern was three contiguous 1 inch squares of red, green, and blue; the test pattern was printed only in the printer mode intended for plain paper at "normal" or standard print speed. Each print pattern was in each case transferred immediately to an absorptive cloth, (i.e., white WYP-ALL), which had been previously saturated with deionized water and wrung out by hand. The image transfer was accomplished using a small hand roller with firm pressure on the unimaged side of the transfer film. Three to four passes with the roller were used per transfer.

After transferring the print to the cloth, the remaining ink on the micro-embossed substrate was measured using a Gretag SPM 55 REFLECTANCE DENSITOMETER. In each case, the level of cyan remaining where the blue square had been printed onto the micro-embossed substrate was measured. The density of cyan was also measured on the unprinted micro-embossed substrates, and this baseline value was then subtracted from the measured density after the transfer was carried out. The cloth was also measured for ink transferred in the same manner, where the baseline cyan density was subtracted from that of the white substrate before transfer. The values for each substrate are shown in Table 5.

TABLE 5

| Substrate | Printer | Percent Ink Transfer |
|---|---|---|
| 7C50 film | HP855Cse | 96 |
| | HP2000C | 95 |
| PVC film | HP855Cse | 99 |
| | HP2000C | 98 |
| THV 200 film | HP855Cse | 100 |
| | HP2000C | 97 |

Example 10

A printed image was generated using a Hewlett-Packard HP855Cse inkjet printer onto the micro-embossed PVC as described in Example 9, except that the printed image was allowed to dry for about 24 hours before transferring the print to the cloth. The percent ink transfer, calculated for cyan as above, was 94 percent.

Example 11

A film consisting of polyethylene coated paper with a thin silicone topcoat was micro-embossed with Pattern 1. A 20 percent solids solution of PVP/VA S-630 poly(vinylpyrrolidone-co-vinyl acetate) in denatured ethanol, was coated onto the micro-embossed film using a #4 Mayer Rod (0.0091 millimeter nominal wet thickness) and the film was dried in a convection oven at 50° C. Polyvinyl pyrrolidone-co-vinyl acetate S-630 is a water soluble adhesive material which becomes quite tacky, or activated, when exposed to aqueous based fluids. To activate particular regions of the PVP/VA S-630 coating, a Hewlett-Packard HP2000C desktop ink jet printer with aqueous inks was used to image the coated film with a pattern that included square regions of black and each of the three secondary colors. The imaged side of the film was contacted with a 0.1 millimeter thick film of polyethylene terephthalate (PET) film that had been primed with polyvinylidene chloride, and moderate pressure was applied to the unimaged film surface with a rubber roller to effect transfer of the ink and the PVP/VA S-630. The transferred image appeared very bright with a minimum of smearing and the imaged regions were tacky indicating the presence of the PVP/VA S-630.

For a comparison, an identically micro-embossed film without the PVP/VA S-630 coating was imaged and contacted with a primed PET film as described above. In this case, there was significant smearing of the inks and the imaged regions were not tacky.

Example 12

Various commercially available inkjet printers were used to transfer images according to the invention, each using the same transfer sheet: a silicone coated LDPE/PET/HDPE co-extruded film transfer sheet construction with Pattern 2. The LDPE layer had the micro-embossed pattern subsequently printed thereon.

The transfer sheet was imaged as described in Example 11 using a test pattern with 4 solid blocks of color (black, red, green, blue) using an inkjet printer operating at its highest image quality settings. Simultaneously, the same test pattern was also printed (with the same printer settings) onto plain (xerographic grade) paper.

The wet ink on each of the transfer sheets was transferred to dry 100 percent cotton cloth (T-shirt weight). After allowing the wet ink to fully dry at ambient conditions (more than 1 day), the color densities of the transferred image and the comparative image on paper were measured with a GRETAG SPM 55 REFLECTANCE DENSITOMETER. Results are shown in Table 6.

TABLE 6

| | | Reflectance Color Density | | | |
|---|---|---|---|---|---|
| Printer | Substrate | Black | Red | Green | Blue |
| HP2000C | Fabric | 1.02 (poor color uniformity, poor edge definition) | 0.91 | 0.75 | 0.95 |
| HP2000C | Fabric/paper | 1.02 (poor color uniformity, poor edge definition)/0.97 | 0.91/1.00 | 0.75/0.89 | 0.95/1.09 |
| HP-870C | Paper/fabric | 0.97/1.04 | 1.00/1.10 | 0.89/0.93 | 1.09/1.27 |
| HP-870C | Fabric/paper | 1.04/1.36 | 1.10/1.11 | 0.93/0.99 | 1.27/1.25 |

TABLE 6-continued

| | | Reflectance Color Density | | | |
|---|---|---|---|---|---|
| Printer | Substrate | Black | Red | Green | Blue |
| HP855Cse | Paper/fabric | 1.36/0.93 | 1.11/1.14 | 0.99/0.97 | 1.25/1.36 |
| HP855Cse | Fabric/paper | 0.93/1.41 | 1.14/1.08 | 0.97/0.96 | 1.36/1.27 |
| HP680C | Paper/fabric | 1.41/1.04 | 1.08/1.34 | 0.96/1.08 | 1.27/1.39 |
| HP680C | Fabric/paper | 1.04/1.32 | 1.34/1.11 | 1.08/1.05 | 1.39/1.27 |
| Canon-7000 | Paper/fabric | 1.32/0.71 | 1.11/0.78 | 1.05/0.63 | 1.27/0.93 |
| Canon-7000 | Fabric/paper | 0.71/1.12 | 0.78/1.04 | 0.63/0.88 | 0.93/1.02 |
| | Paper | 1.12 | 1.04 | 0.88 | 1.02 |

Examples 13 and 14

These examples show that various micro-embossed elements on a substrate will work in the same fashion with similar micro-embossed capacities to provide for aqueous ink transfer to cotton fabric.

Two sample films of 7C50 (ethylene-propylene copolymer) were micro-embossed to provide substrates with micro-embossed patterns. Example 13 had a truncated pyramidal pattern of cavities or cavities of 70 micrometers micro-embossed element pitch, with 5 micrometer wall thickness at the wall tops. Depth of the truncated pyramid was 25 micrometers and the wall bases had a thickness of 19 micrometers. The pattern of Example 14 had cavities of similar dimensions to that of Example 13, but completely without corners or flat areas. The micro-embossed pattern of Example 14 was a random pattern of hemispherical cavities of diameter 50–60 micrometers and a depth of 25–30 micrometers, randomly packed.

Each patterned transfer film was subsequently printed upon with a Hewlett-Packard HP680C desktop printer. The print pattern was three contiguous 1 inch squares of red, green, and blue; the test pattern was printed only in the printer mode intended for plain paper at "normal" or standard print speed. The printed image in each case was transferred immediately to a cotton T-shirt material, which had been dampened prior to the transfer with deionized water to about 100 percent wet pickup based on the initial weight of the material. The image transfer was accomplished using a small hand roller with firm pressure on the unimaged surface of the transfer film. Three to four passes with the roller were used per image transfer.

After transferring the printed image to the cloth, the remaining ink on each micro-embossed transfer film was measured using a GRETAG SPM 55 REFLECTANCE DENSITOMETER. In each case, the level of cyan remaining where the blue square had been printed onto the micro-embossed transfer film was measured. The reflectance color density of cyan was also measured on the unprinted micro-embossed transfer films, and this baseline value was then subtracted from the measured densities of cyan after the transfer was carried out. The results were as follows: Truncated pyramid pattern: cyan=0.083; Hemispherical pattern: cyan=0.094.

The data show that micro-embossed patterns of similar dimensions on the same nonporous film will transfer inks similarly, regardless of the shape of the cavities.

Example 15

Pattern 1 was micro-embossed into a polyethylene coated paper with a thin silicone release coating. A Hewlett-Packard HP-870C desktop inkjet printer using transparency mode, best quality settings, was used to image the micro-embossed side of the film with a pattern consisting of a 2.54 centimeter wide red stripe. With the imaged surface facing outward, the film was wound and attached onto a 3 inch diameter cardboard core. Moderate pressure was applied by hand as the core was rolled against 100 percent cotton T-shirt fabric.

Approximately 50 percent of the ink transferred from the film to the cotton as determined by comparison of the image density of the ink remaining on the film to the ink transferred to the cotton.

Example 16

SCOTCHCAL™ WHITE GRAPHIC MARKING FILM was micro-embossed as described in Example 9. A Hewlett-Packard HP-870C desktop inkjet printer using paper mode, normal quality, was used to image the micro-embossed side of the film with a pattern consisting of adjacent boxes of cyan, magenta and yellow. The imaged film was then attached to a 61 centimeter long section of unembossed SCOTCHCAL™ WHITE GRAPHIC MARKING FILM and the film was wound into an overlapping roll with a diameter of approximately 1.2 centimeter so that the imaged side of the film faced inward.

To form an image, the roll was unwound as the imaged side was contacted with a 100 percent cotton T-shirt fabric. Moderate finger pressure was used to transfer ink from the imaged regions of the micro-embossed film to the cotton fabric. Approximately 60 percent of the ink jetted onto the film was transferred to the cotton as determined comparisons of the image density of the ink remaining on the film to the ink transferred to the cotton.

Comparative Example 3

Figure 8:
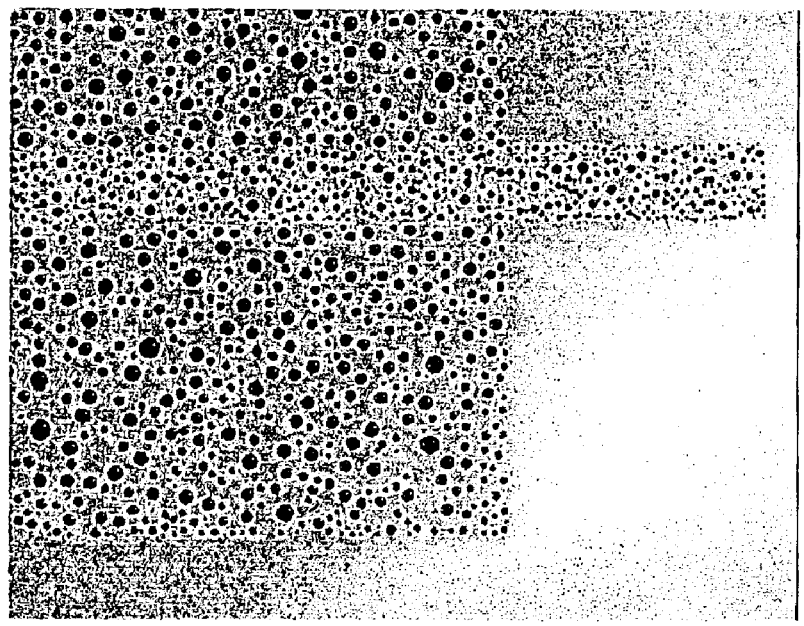

Using a Hewlett-Packard DeskJet HP-870C thermal inkjet printer in plain paper mode at normal print speed, an image of red and blue blocks (100 percent ink complement) with contrasting red and blue lines running through them was generated as a test print. This image was printed onto polyethylene coated paper with a thin silicone release coating. A representative printed area of the image is shown in FIG. 8 in magnified form.

Example 17

Figure 9:
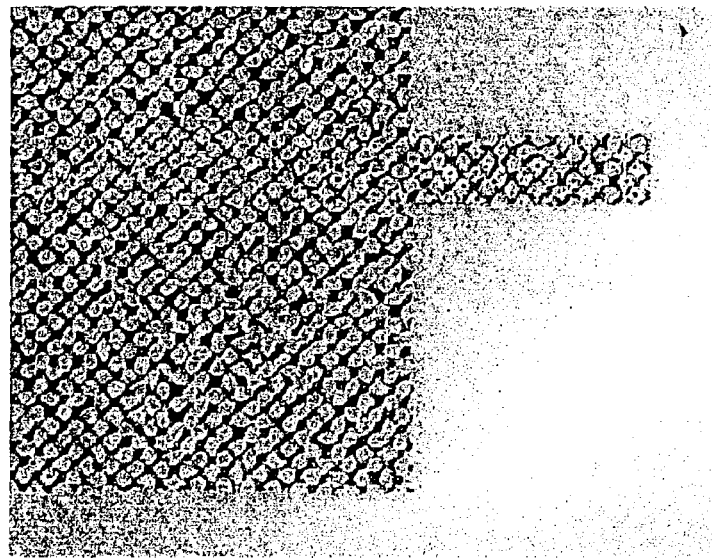

Comparative Example 3 was repeated, except that Pattern 1 was used. A printed area corresponding to the same printed area shown in FIG. 9 is shown in FIG. 10 in magnified form.

Figure 10:
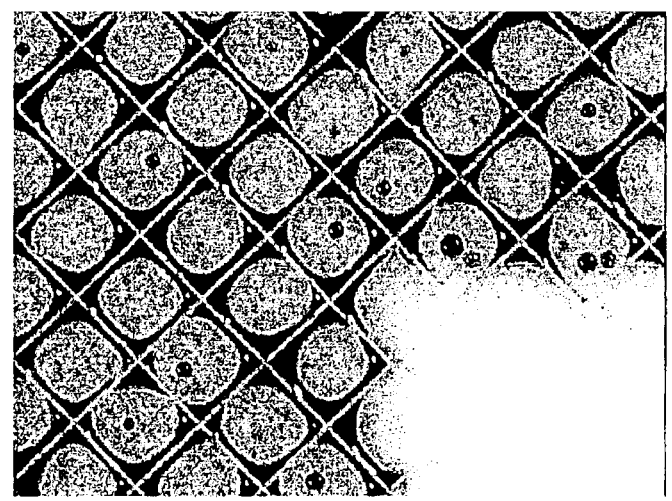

The ink residing in the corners of the square cavities is clearly visible in FIG. 10.

Figure 11:
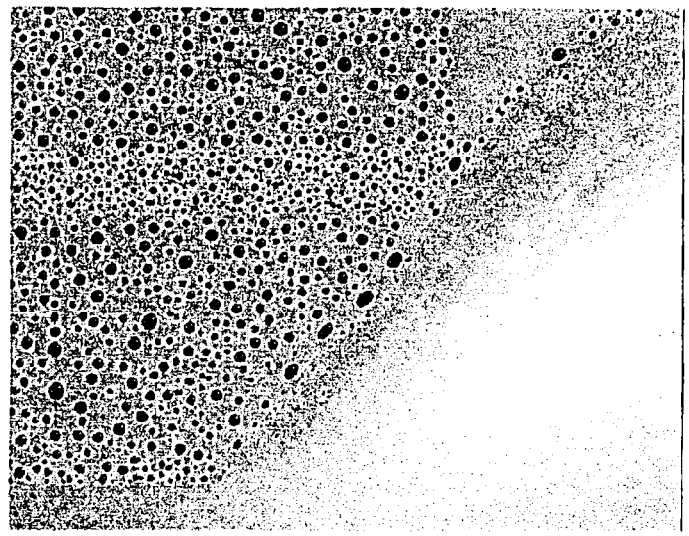
Figure 12:
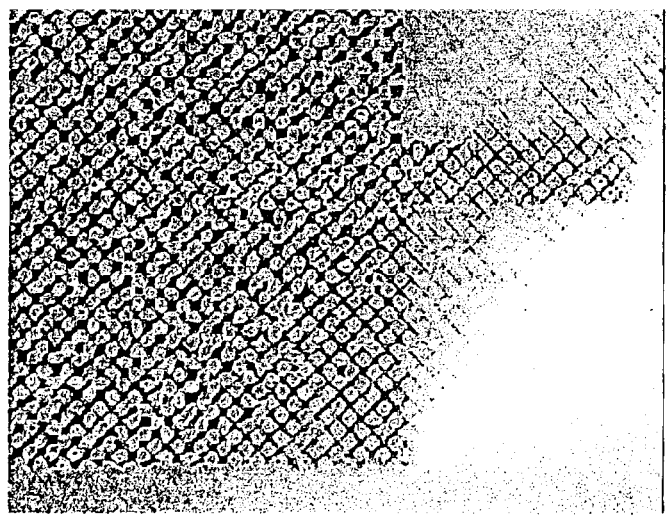

The prints were smeared about 5 minutes after exiting the printer at the same location in each test pattern, using light finger pressure. The image on Comparative Example 3 was catastrophically smeared (i.e., all ink was easily removed) as shown in FIG. 11 in magnified form. The image of Example 17, however, underwent only very slight damage during smear as shown in FIG. 12 in magnified form.

Comparative Example 4

ASPEN SELECT GRADE HOBBY WOOD was sanded with a 3M FINE GRADE SANDING SPONGE before addition of fixing agent. The fixing agent used was 95 weight percent DISPAL 23N4-20 and 5 percent FREESOFT 970. The aqueous mixture (20 percent total solids) was sprayed onto one side of the wood to give an average wet coating weight of 50 g/m$^2$.

Figure 13:
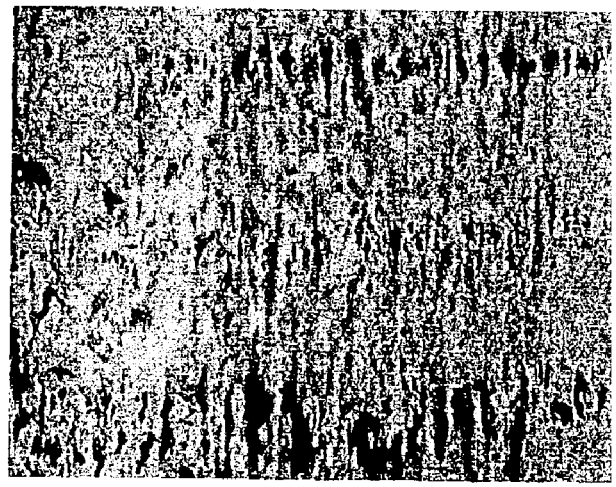

A test pattern consisting of adjacent colored blocks of cyan, magenta, yellow, black, red, green, and blue, along with narrow lines of these colors crossing color bars, were printed onto silicone coated LDPE/PET/HDPE film using a Hewlett-Packard DESKJET HP855Cse thermal inkjet printer in high quality/glossy paper mode. The inked side of the image transfer film was subsequently placed in intimate contact with the treated aspen prepared above, and sufficient pressure applied to cause transfer of the image to the wood. FIG. 13 depicts the magnified image formed in this manner.

Example 18

Figure 14:
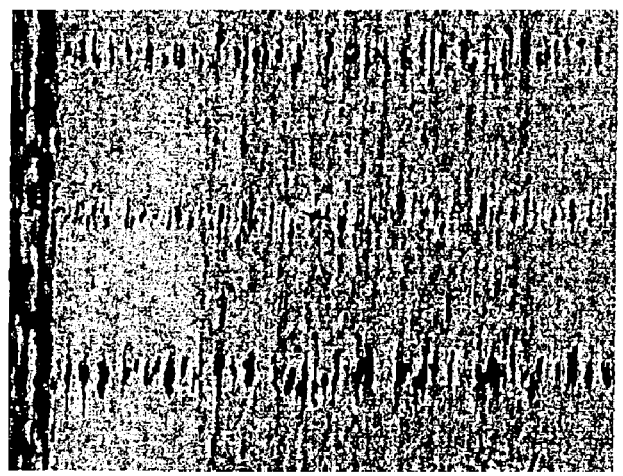

Comparative Example 4 was repeated except that Pattern 2 was micro-embossed into the image transfer film. FIG. 14 depicts the magnified image formed in this manner.

The resulting transferred images clearly showed differences in resolution attributable to the presence or absence of the patterned film used to effect the transfer of ink to the wood surface. The transferred image from the smooth film is prone to show where the ink beaded up, ran together in an uncontrolled fashion, and/or smeared before or during transfer. By comparison, the image transferred by the micro-embossed film has good resolution and ink placement.

Example 19

This example demonstrates the use of microstructures consisting of posts or combinations of posts and wells as image transfer films.

A film consisting of polyethylene coated paper with a thin silicone topcoat (as in Example 12) was embossed with an array of hexagonally packed posts which were about 92 micrometers in diameter at the top and 110 micrometers in diameter at the base of the post. An additional sample of the same film was embossed with a pattern consisting of both an array of 15 micrometer deep hexagonal wells with an overall pitch of 100 lines per inch (39.4 lines/cm) and a random arrangement of 75 micrometer tall posts packed with an average density of about 4.6 posts/mm$^2$ superimposed throughout the well structure. The well walls were 2 micrometers wide at the top and 11 micrometers wide at the bottom, while the posts were 31 micrometers in diameter at the top and 59 micrometers in diameter at the bottom.

Figure 15:
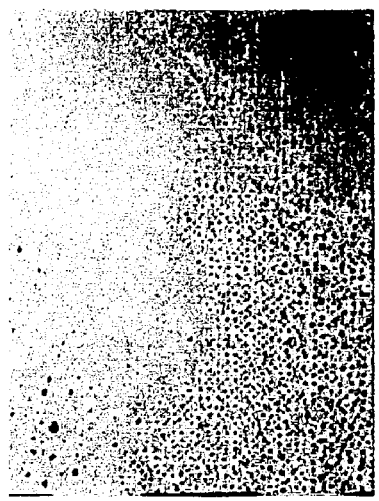
Figure 16:
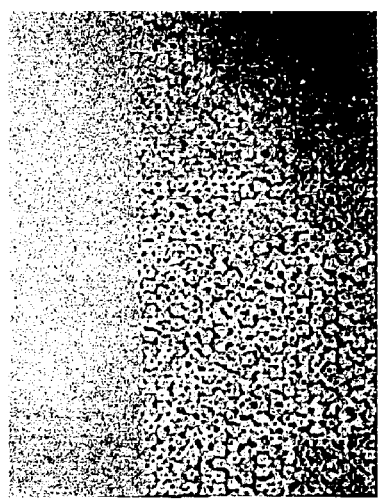
Figure 17:
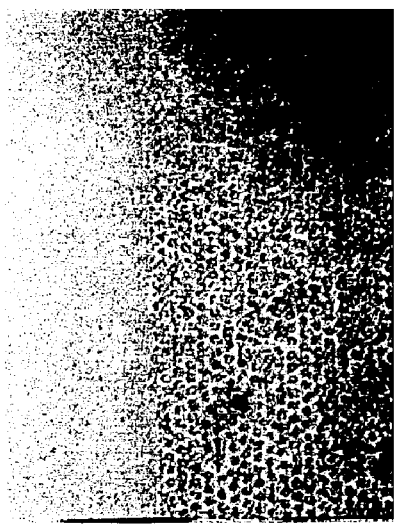

An HP2000C ink jet printer equipped with aqueous inks was used to image each of the embossed films with a pattern consisting of adjacent squares of red, green and blue using paper mode, normal quality. For comparative purposes, an unembossed sheet of polyethylene coated paper with a thin silicone topcoat was also imaged. Each of the freshly imaged films were then smeared with light finger pressure. As shown in FIGS. 15 (unembossed), 16 (hexagonally packed posts) and 17 (hexagonal cavities and random posts) the smear resistance of the embossed films were superior to the unembossed films.

The imaged surface of each of these films were then contacted with a sheet of bond paper (75 g/m$^2$, available from Boise Cascade Paper Division, Boise, Id., USA) and moderate pressure was applied to the unimaged side of the film with a lab roller to effect transfer of the image to the paper. The efficiency of the transfer was determined by comparing the amount of ink transferred to the paper to the amount of ink remaining on the transfer film.

Table 7 shows the ratio of red ink transferred to red ink remaining on the transfer film. In each case, the red ink density was determined by averaging the yellow and magenta intensities that were measured using a Gretag SPM reflectance densitometer. Table 7 shows that image transfer media having embossed post patterns according to the invention provides acceptable ink transfer and protects the image transfer medium from accidental smearing.

TABLE 7

| Ratio of Ink Transferred to Ink Remaining: Transfer Film for Several Patterns | |
|---|---|
| Pattern | Ink Transferred:Ink remaining |
| Hexagonally Packed Posts | 7.9 |
| Hex Wells + Random Posts | 12.4 |
| Unembossed | ~Complete transfer |

Example 20

Table 8 shows a composition (Composition 1) of a coating solution coated onto the color/image transfer medium surface. The composition is prepared by mixing a copolyester resin (VITEL-2700B) in a glass beaker (1 L capacity) using a mechanical stirrer at ambient temperature.

TABLE 8

| Component | Weight/g | Weight % |
|---|---|---|
| VITEL-2700B | 75 g | 15% |
| Toluene | 360 g | 72% |
| Isopropyl Alcohol | 65 g | 13% |
| Total = | 500 g | |

Compositon-1 was coated onto a silicone coated LDPE/PET/HDPE film having Pattern 2 micro-embossed thereon. The film was air dried for 10 min or dried at ~50° C. for ½ min to obtain a clear-coated film. When imaged using a Hewlett Packard HP855Cse or HP2000C, LEXMARK Z11 or Epson 2 printer, the image transfer medium provided a higher density solid-color image which was recognizable by the naked eye. The color/image densities of the colors on this medium were compared with transfer media having no Composition-1 coating. The data is shown in Table 9 below.

TABLE 9

| Micro-embossed LDPE/PET/HDPE | | Color Density | | | | | | |
|---|---|---|---|---|---|---|---|---|
| (Pattern 2) | Printer | Green | Red | Blue | Magenta | Cyan | Yellow | Black |
| No Coating/15 μm | HP855Cse | 0.560 | 0.481 | 0.496 | 0.361 | 0.369 | 0.340 | 0.327 |
| With Coating/15 μm | " | 1.753 | 1.730 | 1.812 | 1.064 | 1.379 | 1.064 | 0.477 |
| No Coating/25 μm | " | 0.323 | 0.309 | 0.303 | 0.196 | 0.196 | 0.190 | 0.193 |
| With Coating/25 μm | " | 0.984 | 0.879 | 0.948 | 0.591 | 0.732 | 0.600 | 0.456 |
| No Coating/15 μm | HP2000C | 0.490 | 0.534 | 0.443 | 0.437 | 0.360 | 0.485 | 0.322 |
| With Coating/15 μm | " | 1.563 | 1.949 | 1.545 | 1.448 | 1.201 | 1.626 | 0.670 |
| No Coating/15 μm | LEXMARK Z11 | 0.352 | 0.375 | 0.324 | 0.330 | 0.305 | 0.361 | 0.392 |
| With Coating/15 μm | " | 0.562 | 0.517 | 0.487 | 0.455 | 0.507 | 0.532 | 0.557 |
| No Coating/25 μm | " | 0.350 | 0.311 | 0.223 | 0.210 | 0.201 | 0.195 | 0.358 |
| With Coating/25 μm | " | 0.449 | 0.463 | 0.411 | 0.345 | 0.377 | 0.364 | 0.557 |
| No Coating/15 μm | Epson II | 0.289 | 0.253 | 0.272 | 0.240 | 0.252 | 0.197 | 0.245 |
| With Coating/15 μm | " | 0.698 | 0.541 | 0.847 | 0.532 | 0.700 | 0.205 | 0.321 |

The data show that the Composition-1 coating significantly enhanced the color/image density and provided improved color uniformity to the color/image on the uncoated image transfer medium.

Example 21

Table 10 shows a comparison of % Color Image transfer from an uncoated image transfer medium and an image transfer medium coated with Composition 1. An image receiving medium was prepared by coating a piece of 100% cotton T-shirt cloth with a coating prepared by combining 60 g VIVIPRINT 111, 80 g deionized water, 60 g DISPAL 11N7-12, 12 g AIRFLEX 460, 60 g of a mixture of 8 g $Al_2(SO_4)_3 \cdot 14H_2O$ and 1.67 dihexyl sulfosuccinate in a mixture of 75 g deionized water and 25 g isopropanol, and 20 g of 1 weight percent aqueous sodium carboxymethylcellulose in deionized water. The coating process was carried out using a using a #26 Mayer rod followed by drying of the coating.

Image transfer was carried out by intimately contacting the imaged surface of the image transfer medium with the receptor sheet and rubbing with pressure applied by hand.

Composition 1 did not have any affect on the color/image transfer. Color density of the imaged film was measured in a densitometer and the results are shown in Table 10.

TABLE 10

| Micro-embossed LDPE/PET/HDPE | | % Color/Image Transfer | |
|---|---|---|---|
| (Pattern 2) | Printer | Colors* | Black |
| No Coating/15 μm | HP855Cse | 94 | 52 |
| With Coating/15 μm | " | 89 | 41 |
| No Coating/15 μm | HP2000C | 93 | 48 |
| With Coating/15 μm | " | 91 | 22 |
| No Coating/15 μm | LEXMARK Z11 | 98 | |
| With Coating/15 μm | " | 98 | |
| No Coating/15 μm | Epson II | 94 | 72 |
| With Coating/15 μm | " | 91 | 47 |
| No Coating/15 μm | Epson Photo | 78 | 83 |
| With Coating/15 μm | " | 82 | 76 |

*based on average density of all the colors

Example 22

This example shows the dry time of an imaged uncoated image transfer medium and an image transfer medium coated with Composition 1 at ambient temperature. Dry time was measured by (1) observing the disappearance of wetness on the film and (2) by laying a piece of plain paper onto the color/image (without putting any hand pressure) observing color transfer (if any) to the plain paper.

TABLE 11

| Micro-embossed LDPE/PET/HDPE (Pattern 2) | Printer | Dry-Time |
|---|---|---|
| No Coating/15 μm | HP855Cse | indefinite |
| With Coating/15 μm | " | 7–8 minutes |
| No Coating/25 μm | " | indefinite |
| With Coating/25 μm | " | 7–8 minutes |
| No Coating/15 μm | HP2000C | indefinite |
| With Coating/15 μm | " | 20 minutes |
| No Coating/15 μm | LEXMARK Z11 | indefinite |
| With Coating/15 μm | " | ~2 days |
| No Coating/25 μm | " | indefinite |
| With Coating/25 μm | " | ~2 days |
| No Coating/15 μm | Epson II | indefinite |
| With Coating/15 μm | " | ~1 hour |
| No Coating/15 μm | Epson Photo | indefinite |
| With Coating/15 μm | " | ~1 hour |

Example 23

This example shows that a color/image can be transferred from a color/image transfer medium coated with Composition 1 after imaging at various times.

TABLE 12

| Coated Micro-embossed LDPE/PET/HDPE (Pattern 2) | Printer | Color Transfer Time (After Color Printing) | % Color Transfer |
|---|---|---|---|
| 15 μm | HP855Cse | 1/2 hour | 92 |
| | | 24 hours | 93 |
| | | 48 hours | 89 |
| 15 μm | HP2000C | 1/2 hour | 95 |
| | | 24 hours | 93 |
| | | 48 hours | 92 |

Various modifications and alterations of this invention will become apparent to those skilled in the art without departing from the scope and spirit of this invention, and it should be understood that this invention is not to be unduly limited to the illustrated embodiments set forth herein.

What is claimed is:

1. An imaged transfer medium comprising a sheet having a nonporous micro-embossed surface topography comprising micro-embossed elements on one major surface of the sheet, the micro-embossed elements having at pitch of from 197 to less than 340 micometers and an ink release coating on the micro-embossed surface, wherein said major surface has a surface energy of about 43 dyne/centimeter or less wherein the ink release coating comprises polydimethysiloxane and having a material deposited on the micro-embossed surface.

2. The imaged transfer medium of claim 1 wherein the micro-embossed elements are cavities and the cavities have a depth of at least about 25 micrometers.

3. The imaged transfer medium of claim 1 wherein the micro-embossed surface comprises a pattern over the area of the major surface wherein the pattern is regular, random, or combination.

4. The imaged transfer medium of claim 1 wherein the micro-embossed surface has a topography to protect printed material from abrasion from items contacting the micro-embossed surface.

5. The imaged transfer medium of claim 1 wherein the ink release coating further comprises fluorinated surfactants, silicone surfactants, silicones, fluorochemicals, polymers of silicones, polymers of fluorochemicals, and combinations thereof.

6. The imaged transfer medium of claim 1 wherein the micro-embossed elements are cavities and wherein each cavity holds at least 10 pL of ink.

7. The imaged transfer medium of claim 1 wherein the micro-embossed elements are cavities and wherein each cavity has a volume of about 1 to about 10,000 pL.

8. The imaged transfer medium or claim 1 wherein the micro-embossed elements are cavities and wherein the cavities have an aspect ratio of about 0.01 to about 2.

9. The imaged transfer medium of claim 1 wherein the micro-embossed elements are cavities and wherein the cavities have a depth of from about 5 to about 100 micrometers.

10. The imaged transfer medium of claim 1 wherein the sheet is transparent, translucent, or opaque, wherein the sheet is clear or tinted, wherein the sheet is optically transmissive, or combinations thereof.

11. The imaged transfer medium of claim 1 wherein the sheet is a polymeric film selected from the group consisting of polyolefins, poly(vinyl chloride), copolymers of ethylene with vinyl acetate or vinyl alcohol, polycarbonate, norbornene copolymers, reactive silicones, fluorinated thermoplastics such as copolymers and terpolymers comprising hexafluoropropylene, vinylidene fluoride, tetrafluoroethylene, or vinyl fluoride, and surface modified versions thereof, poly(ethylene terephthalate) and copolymers thereof, polyurethanes polyimides, acrylics, and filled versions thereof.

12. The imaged transfer medium of claim 1 wherein the sheet comprises two or more layers.

13. The imaged transfer medium of claim 1 further comprising an adhesive layer on a major surface opposite the micro-embossed surface.

14. The imaged transfer medium of claim 13 further comprising a release liner protecting the adhesive layer.

15. The imaged transfer medium of claim 1 wherein the material is jettable.

16. The imaged transfer medium of claim 15 wherein the jettable material is selected from the group consisting of inks, adhesives, biological fluids, pharmaceuticals, chemical assay reagents, particulate dispersions, waxes, and combinations thereof.

17. The imaged transfer medium of claim 15 wherein the jettable material is a pigmented ink.

18. The imaged transfer medium of claim 1 further having an ink receptive medium on the micro-embossed surface.

19. The imaged transfer medium of claim 1 wherein the ink release coating comprises polydimethylsiloxane surface energy modifying additives in the sheet.

20. The imaged transfer medium of claim 1 wherein the micro-embossed elements are posts.

21. The imaged transfer medium of claim 1 wherein the micro-embossed elements are a combination of cavities and posts.

22. The imaged transfer medium of claim 18 wherein the ink receptive medium is a co-polyester.

* * * * *

UNITED STATES PATENT AND TRADEMARK OFFICE
CERTIFICATE OF CORRECTION

PATENT NO. : 6,974,609 B2
APPLICATION NO. : 10/368824
DATED : December 13, 2005
INVENTOR(S) : Lori P. Engle Page 1 of 1

It is certified that error appears in the above-identified patent and that said Letters Patent is hereby corrected as shown below:

Title page,
Item (54), before "MEDIA" insert -- IMPROVED --.

Column 1,
Line 1, before "MEDIA" insert -- IMPROVED --.
Line 6, after "2001" insert -- , --.

Column 14,
Table 1, Line 37, delete "(Damp cotton)" and insert in place thereof -- (Damp Cotton) --.

Column 23,
Line 33, delete "1.67" and insert in place thereof -- 1.67 g --.

Column 25,
Line 2, delete "at" and insert in place thereof -- a --.
Line 3, delete "micometers" and insert in place thereof -- micrometers --.
Line 31, delete "or" and insert in place thereof -- of --.

Column 26,
Line 10, delete "polyurethanes polymides" and insert in place thereof -- polyurethanes, polyimides --.

Signed and Sealed this

Sixth Day of March, 2007

JON W. DUDAS
*Director of the United States Patent and Trademark Office*